United States Patent
Nakasato

(10) Patent No.: US 8,705,433 B2
(45) Date of Patent: Apr. 22, 2014

(54) BASE STATION, COMMUNICATION TERMINAL AND COMMUNICATION SYSTEM

(75) Inventor: Yuuki Nakasato, Yokohama (JP)

(73) Assignee: KYOCERA Corporation, Kyoto (JP)

(*) Notice: Subject to any disclaimer, the term of this patent is extended or adjusted under 35 U.S.C. 154(b) by 69 days.

(21) Appl. No.: 13/579,275

(22) PCT Filed: Feb. 18, 2011

(86) PCT No.: PCT/JP2011/053460
§ 371 (c)(1),
(2), (4) Date: Aug. 15, 2012

(87) PCT Pub. No.: WO2011/102445
PCT Pub. Date: Aug. 25, 2011

(65) Prior Publication Data
US 2012/0307718 A1  Dec. 6, 2012

(30) Foreign Application Priority Data
Feb. 18, 2010  (JP) .................... 2010-034005

(51) Int. Cl.
*H04J 1/10* (2006.01)
(52) U.S. Cl.
USPC .......................................... 370/315
(58) Field of Classification Search
USPC ......... 370/315, 324, 328, 330, 332, 338, 341, 370/343, 345, 350, 431, 436, 395, 3, 395.4, 370/437, 450, 358, 508, 516; 455/500
See application file for complete search history.

(56) References Cited

U.S. PATENT DOCUMENTS

| | | | |
|---|---|---|---|
| 8,213,407 B2* | 7/2012 | Takamatsu et al. | 370/350 |
| 8,452,240 B2* | 5/2013 | Takahashi | 455/75 |
| 2005/0237918 A1 | 10/2005 | Asai et al. | |
| 2008/0045145 A1 | 2/2008 | Nakatsugawa | |

FOREIGN PATENT DOCUMENTS

| | | |
|---|---|---|
| JP | 2001-103559 A | 4/2001 |
| JP | 2005-303826 A | 10/2005 |
| JP | 2008-048218 A | 2/2008 |
| JP | 2009-206810 A | 9/2009 |
| WO | 2010/137106 A1 | 12/2010 |

OTHER PUBLICATIONS

International Preliminary Report on Patentability issued for International Application No. PCT/JP2011/053460.

(Continued)

*Primary Examiner* — Chi Pham
*Assistant Examiner* — Alexander O Boakye
(74) *Attorney, Agent, or Firm* — Procopio, Cory, Hargreaves & Savitch LLP

(57) ABSTRACT

A base station (10B) includes a wireless communication unit (11) for performing wireless communication with a communication terminal (30A), a radio resource allocation unit (131) for allocating an individual channel in a resource of the wireless communication, a transmission/reception timing determination unit (132) for determining a transmission/reception timing at which transmission and reception with the communication terminal (30A) through the individual channel is performed, a communication state identification unit (134) for identifying whether the communication with the communication terminal (30A) is indirect communication with interposition of a relay device (50) or direct communication without interposition of the relay device 50, and a reception timing adjustment unit (133) for adjusting a timing at which the individual channel for upstream communication is used in accordance with a result of the identification made by the communication state identification unit (134).

5 Claims, 10 Drawing Sheets

(56) References Cited

OTHER PUBLICATIONS

AARIB Standard, OFDMA/TDMA TDD Broadband Wireless Access System (Next Generation PHS), ARIB STD-T95 Version 1.1, Jun. 8, 2008, Association of Radio Industries and Businesses.
ARIB Standard, OFDMA/TDMA TDD Broadband Wireless Access System (Next Generation PHS), ARIB STD-T95 Version 1.3, Dec. 16, 2009, Association of Radio Industries and Businesses.
Office Action dated Nov. 19, 2013, issued in counterpart Japanese application No. 2010-034005.
Japanese Patent Application Laid-open No. 2008-48218.
Japanese Patent Application Laid-open No. 2009-206810.
Japanese Patent Application Laid-open No. 2005-303826.
Japanese Patent Application Laid-open No. 2001-103559.

* cited by examiner

F I G. 3
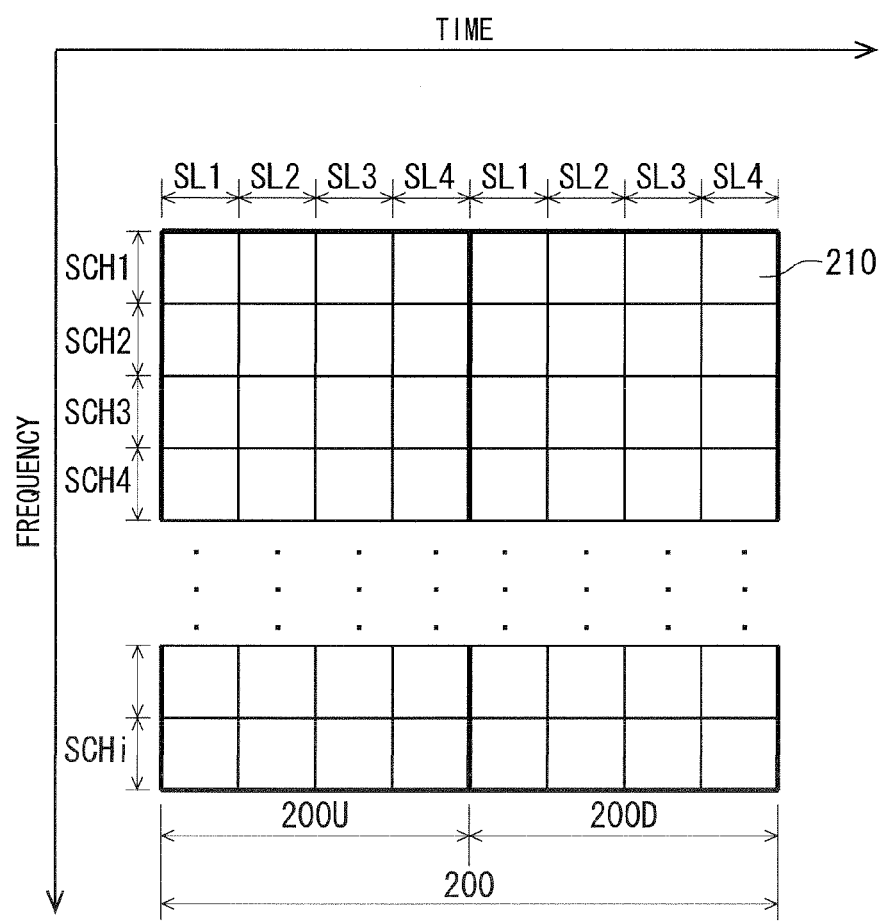

F I G . 5
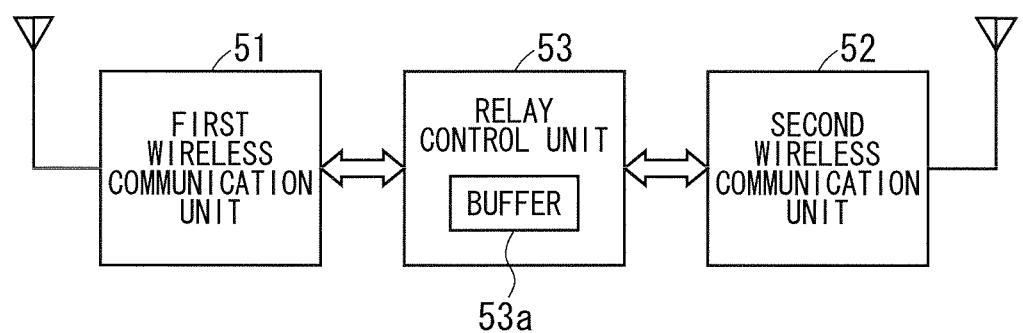

BASE STATION, COMMUNICATION TERMINAL AND COMMUNICATION SYSTEM

TECHNICAL FIELD

The present invention relates to a communication technology.

BACKGROUND ART

Conventionally, various techniques have been proposed for a communication system. For example, Non-Patent Document 1 discloses a standard for a communication system called a next-generation PHS (Personal Handyphone System). This standard is called XGP (eXtended Global Platform).

PRIOR-ART DOCUMENTS

Non-Patent Documents

Non-Patent Document 1: "OFDMA/TDMA TDD Broadband Wireless Access System (Next Generation PHS) ARIB STANDARD", ARIB STD-T95 Version 1.3, Dec. 16, 2009, Association of Radio Industries and Businesses

SUMMARY OF THE INVENTION

Problems to be Solved by the Invention

In a case where a communication terminal is located in a place having a poor coverage for radio waves from a base station, for example, located behind a building or inside a building, the base station may not be capable of direct communication with the communication terminal. In this case, a relay device is placed in an appropriate position in a communication system, and thus communication between the base station and the communication terminal can be performed via the relay device.

However, in high-speed wireless communication such as the next-generation PHS, a used signal includes a large amount of information, and therefore in some cases, a delay may occurs in a process in the relay device to make it impossible to relay the signal in real time.

In the XGP, communication between a base station and a communication terminal is performed while timings of transmission and reception therebetween are fixedly synchronized. Accordingly, if a relay device that cannot relay a signal in real time is interposed between the base station and the communication terminal, the timings of transmission and reception between the base station and the communication terminal are shifted, which may result in an inability to perform communication between the base station and the communication terminal.

The present invention is made in view of the above-described points, and an object of the present invention is to provide a technique capable of performing communication between a base station and a communication terminal even with a relay device interposed therebetween.

Means for Solving the Problems

A base station according to the present invention includes: a communication unit for performing wireless communication with a communication terminal; a channel allocation unit for allocating an individual channel in a resource of the wireless communication; a determination unit for determining a transmission/reception timing at which transmission and reception with the communication terminal through the individual channel is performed; an identification unit for identifying whether communication with the communication terminal is indirect communication with interposition of a relay device or direct communication without interposition of the relay device; and an adjustment unit for adjusting a timing at which an individual channel for upstream communication is used in accordance with a result of the identification made by the identification unit. The communication unit notifies the communication terminal of the transmission/reception timing and an individual channel allocated by the channel allocation unit. The adjustment unit uses the individual channel for upstream communication at the transmission/reception timing in a case where communication with the communication terminal is direct communication, and uses the individual channel for upstream communication at a timing later than the transmission/reception timing in a case where communication with the communication terminal is indirect communication.

In one aspect of the base station according to the present invention, the adjustment unit determines a usage timing at which an individual channel is used in a case of the indirect communication, based on the amount of delay in a relay process performed by the relay device.

A communication terminal according to the present invention includes: a communication unit for performing wireless communication with a base station; an identification unit for identifying whether communication with the base station is indirect communication with interposition of a relay device or direct communication without interposition of the relay device; and an adjustment unit for adjusting a timing at which an individual channel for upstream communication is used in accordance with a result of the identification made by the identification unit. The communication unit receives, from the base station, information concerning a transmission/reception timing at which transmission and reception with a base station is performed and information concerning allocation of an individual channel. The adjustment unit uses the individual channel for upstream communication at the transmission/reception timing in a case where communication with the base station is direct communication, and uses the individual channel for upstream communication at a timing earlier than the transmission/reception timing in a case where communication with the base station is indirect communication.

A communication system according to the present invention includes: a base station associated with a communication terminal; and a relay device configured to relay a signal from the communication terminal to the base station and to relay a signal from the base station to the communication terminal. The base station includes: a communication unit for performing wireless communication with the communication terminal; a channel allocation unit for allocating an individual channel in a resource of the wireless communication; a determination unit for determining a transmission/reception timing at which transmission and reception with the communication terminal through the individual channel is performed; an identification unit for identifying whether communication with the communication terminal is indirect communication with interposition of a relay device or direct communication without interposition of the relay device; and an adjustment unit for adjusting a timing at which an individual channel for upstream communication is used in accordance with a result of the identification made by the identification unit. The communication unit notifies the communication terminal of the transmission/reception timing and an individual channel allocated by the channel allocation unit. The adjustment unit uses the individual channel for upstream communication at the transmission/reception timing in a case where communication with the communication terminal is direct communication, and uses the individual channel for upstream communication at a timing later than the transmission/reception timing in a case where communication with the communication terminal is indirect communication.

A communication system according to the present invention includes: a communication terminal; a base station configured to communicate with the communication terminal; and a relay device configured to relay a signal from the communication terminal to the base station and to relay a signal from the base station to the communication terminal. The base station includes: a communication unit for performing wireless communication with the communication terminal; a channel allocation unit for allocating an individual channel in a resource of the wireless communication; and a determination unit for determining a transmission/reception timing at which transmission and reception with the communication terminal through the individual channel is performed. The communication unit of the base station notifies the communication terminal of the transmission/reception timing and an individual channel allocated by the channel allocation unit. The communication terminal includes: a communication unit for performing wireless communication with the base station; an identification unit for identifying whether communication with the base station is indirect communication with interposition of a relay device or direct communication without interposition of the relay device; and an adjustment unit for adjusting a timing at which an individual channel for upstream communication is used in accordance with a result of the identification made by the identification unit. The adjustment unit uses the individual channel for upstream communication at the transmission/reception timing in a case where communication with the base station is direct communication, and uses the individual channel for upstream communication at a timing earlier than the transmission/reception timing in a case where communication with the base station is indirect communication.

Effects of the Invention

The present invention enables communication between the base station and the communication terminal even with the relay device interposed therebetween.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 A diagram showing a configuration of a TDMA/TDD frame.

FIG. 5 A block diagram showing a configuration of a relay device.

EMBODIMENT FOR CARRYING OUT THE INVENTION

Hereinafter, embodiments will be described with reference to the drawings.

<1. First Embodiment>
[1-1. Outline of Configuration]

Figure 1:
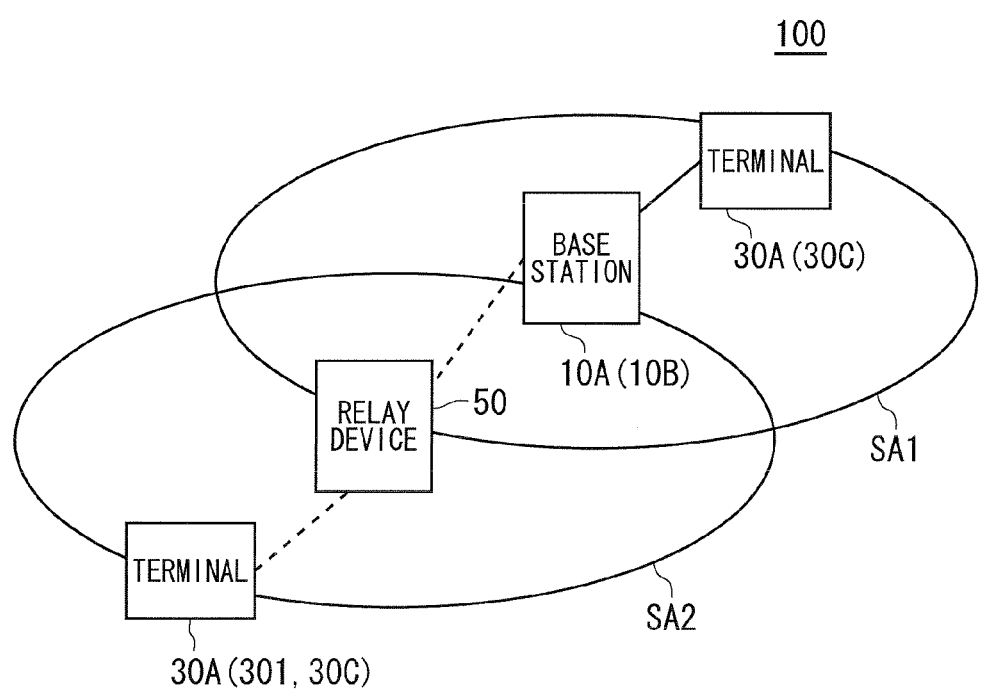
FIG. 1 A diagram showing a configuration of a wireless communication system according to a first embodiment.

FIG. 1 is a diagram showing a configuration of a wireless communication system (communication system) 100 according to a first embodiment.

As shown in FIG. 1, the wireless communication system 100 according to this embodiment is a communication system in the XGP that is a normal standard of the next-generation PHS, and includes a base station 10A, a relay device (also referred to as "relay station") 50, and a communication terminal (also referred to as "mobile station") 30A.

The base station 10A performs bi-directional wireless communication with a plurality of communication terminals 30A existing in a communicable area (service area) SA1 by a communication scheme using the OFDMA (Orthogonal Frequency Division Multiple Access). More specifically, the base station 10A individually allocates, among wireless radio wave resources (also referred to as "radio resource") identified on two dimensions having a time axis and a frequency axis, a particular radio resource to each of the plurality of communication terminals 30A, and thereby can simultaneously communicate with the plurality of communication terminals 30A. The base station 10A has an array antenna as a transmission/reception antenna, and, by using the adaptive array antenna scheme, can orient the directivity of the array antenna to a desired wave.

The base station 10A is connected to another base station (not shown) via a network NT (FIG. 2) serving as a backbone network, and thus implements communication between a plurality of communication terminals 30A located remote from each other.

The relay device 50 of the wireless communication system 100 substantially expands the service area SA1 of the base station 10A, in order to enables the base station 10A to communicate with the communication terminal 30A existing outside the communicable area (service area) SA1 of the base station 1A. For example, in FIG. 1, a communication terminal 301 does not exist in the service area SA1 of the base station 10A but exists in a service area SA2 of the relay device 50, and therefore can communicate with the base station 10A via the relay device 50.

[1-2. Specific Configuration]

Figure 2:
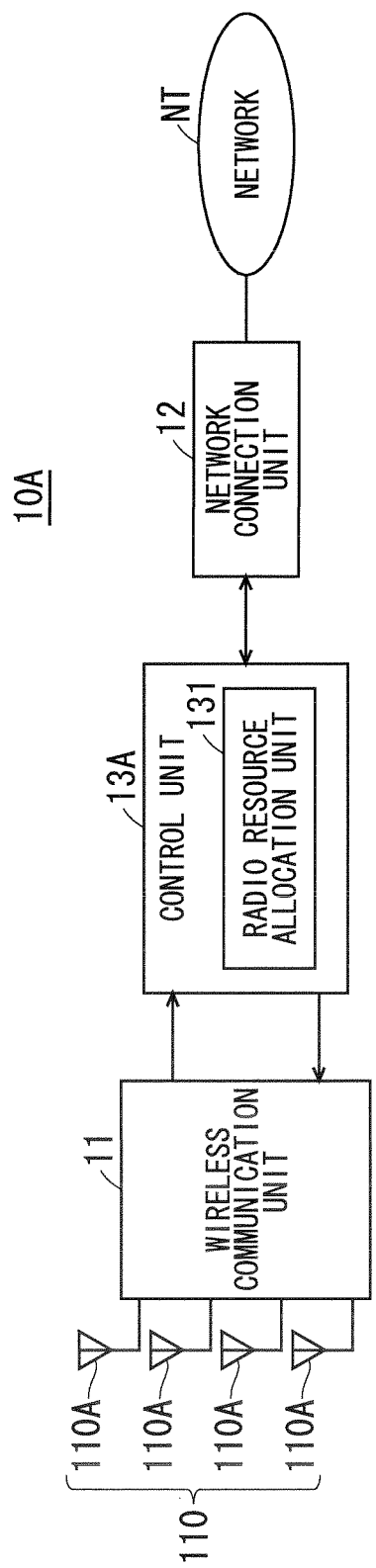
FIG. 2 A block diagram showing a configuration of a base station according to the first embodiment.

In the following, specific configurations of the base station 10A and the relay device 50 included in such a wireless communication system 100 will be described in detail. FIG. 2 is a block diagram showing a configuration of the base station 10A.

As shown in FIG. 2, the base station 10A includes a wireless communication unit 11 for performing wireless communication, a network connection unit 12 for connecting to the network NT, and a control unit 13A for performing an overall control of the base station 10A.

The wireless communication unit 11 obtains data from an OFDM (Orthogonal Frequency Division Multiplexing) signal received by a plurality of antenna elements 110A included in an array antenna 110, and outputs the data to the control unit 13A. The wireless communication unit 11 generates an OFDM signal including transmission data received from the control unit 13A, and wirelessly transmits the OFDM signal via the array antenna 110.

The network connection unit 12 is connected to the network NT by, for example, an optical fiber. The network connection unit 12 transmits data received from the control unit 13A to the network NT, and outputs data received from the network NT to the control unit 13A.

The control unit 13A includes a CPU, a RAM (Random Access Memory), a ROM (Read Only Memory), and the like. The control unit 13A reads out a program stored in the ROM, and the CPU executes the program to thereby functionally implement a radio resource allocation unit (channel allocation unit) 131.

The radio resource allocation unit 131 allocates the radio resource (hereinafter also referred to simply as "resource") to the communication terminal 30A serving as a communication object. The allocated radio resource is used as various functional channels.

As described above, the radio resource is identified on the two dimensions having the frequency axis and the time axis, and includes a plurality of TDMA/TDD (Time Division Multiple Access/Time Division Duplexing) frames 200. FIG. 3 is a diagram showing a configuration of the TDMA/TDD frame 200.

As shown in FIG. 3, the TDMA/TDD frame 200 is identified on a time-frequency plane with the horizontal axis and the vertical axis thereof representing time and frequency, respectively.

One TDMA/TDD frame 200 (unit TDMA/TDD frame) includes an upstream frame 200U for transmitting an upstream signal from the communication terminal 30A to the base station 10A, and a downstream frame 200D for transmitting a downstream signal from the base station 10A to the communication terminal 30A. Each of the upstream frame 200U and the downstream frame 200D is divided into four sections in the time direction, and includes a first slot SL1 to a fourth slot SL4. In the TDMA/TDD frame 200, the time width of one slot (unit slot) is set to be 625 µs, and each of the upstream frame 200U and the downstream frame 200D has a time length of 2.5 ms, and the unit TDMA/TDD frame has a time length of 5 ms.

Each of the slots SL1 to SL4 included in the upstream frame 200U will be also referred to as "upstream time slot", and each of the slots SL1 to SL4 included in the downstream frame 200D will be also referred to as "downstream time slot".

The TDMA/TDD frame 200 includes a first sub channel SCH1 to an i-th sub channel SCHi (i>1) in the frequency direction. The bandwidth of one sub channel (unit sub channel) is 900 kHz, and one sub channel includes twenty-four subcarriers.

In the TDMA/TDD frame 200, one slot and one sub channel form one PRU (Physical Resource Unit) 210. The communication between the base station 10A and the communication terminal 30A is performed on a unit basis of this PRU 210. More specifically, in the base station 10A, the allocation of the radio resource to the communication terminal 30A is performed on a unit basis of the PRU 210, and a modulation scheme used for transmitting the transmission data to the communication terminal 30A is determined for each PRU 210.

In each of the upstream frame 200U and the downstream frame 200D, four PRUs 210 are arranged along the time direction, and in the unit TDMA/TDD frame, eight PRUs 210 are arranged along the time direction. In the TDMA/TDD frame 200, i PRUs 210, the number of which is equal the number of the sub channels, are arranged in the frequency direction.

In the next-generation PHS, a common channel (CCH: Common Channel) and an individual channel (ICH: Individual Channel) are specified as the functional channels.

The common channel is a transmission path (channel) for transmitting information (also referred to as "control information") that is used for establishing communication between the base station 10A and the communication terminal 30A, and the individual channel is a transmission path that is used after the communication is established between the base station 10A and the communication terminal 30A.

The base station 10A and the communication terminal 30A firstly exchange information by using the common channel (initial communication), to establish unique communication between the base station 10A and the communication terminal 30A. Then, after the unique communication is established, information exchange is performed by using the individual channel (individual communication).

In the next-generation PHS, the first sub channel SCH1 of each TDMA/TDD frame 200 is allocated as the common channel, and the other sub channels (the second sub channel SCH2 to the i-th sub channel SCHi) are allocated as the individual channels. Accordingly, a plurality of base stations use the same sub channel as a resource of the common channel, to transmit a signal (also referred to as "CCH signal") including the control information.

In the next-generation PHS, the autonomous distributed system is adopted in order to avoid interference between base stations. More specifically, the base station 10A detects allocation of radio resources as the common channel in another base station (also referred to as "surrounding base station") located in the surroundings to thereby detect an empty resource, and transmits the CCH signal through a slot that is not used in the transmission of the CCH signal of the surrounding base station. This enables the base station 10A to avoid interference with the CCH signal transmitted from the surrounding base station.

Since the control information has a small amount of data, each of the base stations are configured to transmit the control information of the own station at certain intervals (intermittent transmission). Such intermittent transmission of the control information is performed, for example, at intervals of 20 times the time length of the unit TDMA/TDD frame. The radio resource allocation unit 131 allocates, as the common channel, the first sub channel SCH1 in a time slot in accordance with a timing at which the intermittent transmission of the control information is performed. The TDMA/TDD frame 200 having the time slot in which the common channel is allocated will be also referred to as an intermittent transmission frame.

In the TDMA/TDD frame 200, the functional channel is allocated to each of a pair of upstream and downstream time slots. For example, in a case where, in the intermittent transmission frame, a common channel for upstream communication is allocated to an upstream time slot, a common channel for downstream communication is allocated to a downstream time slot that is paired with this upstream time slot. A timing to which the common channel for downstream communication is allocated is a transmission timing at which the downstream signal from the base station 10A to the communication terminal 30A is transmitted, and a timing to which the common channel for upstream communication is allocated is a reception timing at which the upstream signal from the communication terminal 30A to the base station 10A is received.

The allocation of the functional channel is made to a PRU included in the time slot. However, for the purpose of convenience, this specification describes that the functional channel is allocated on a slot basis.

Figure 4:
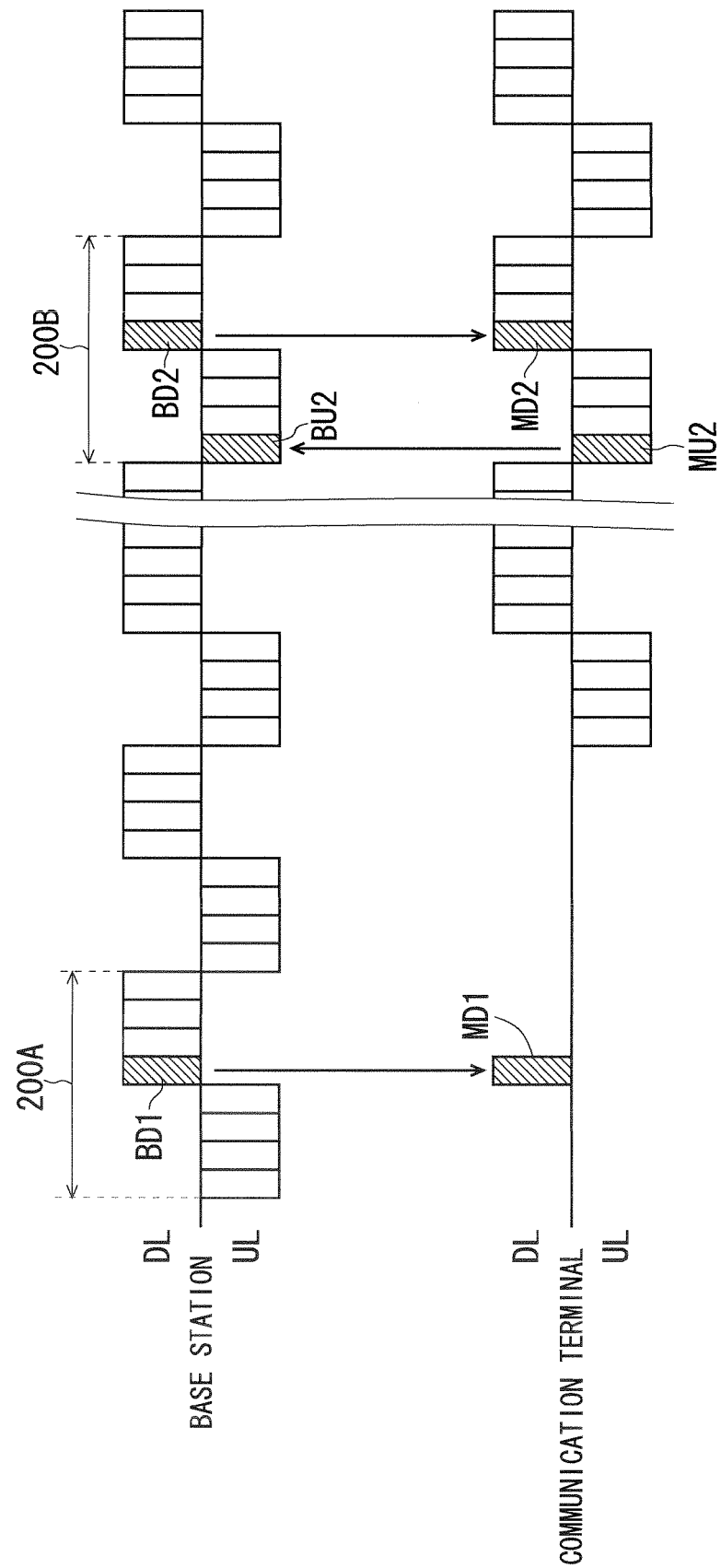
FIG. 4 A diagram for explaining initial communication through a common channel.

Here, the initial communication for establishing the individual communication between the base station 10A and the communication terminal 30A will be described in detail. FIG. 4 is a diagram for explaining the initial communication through the common channel between the base station 10A and the communication terminal 30A. In FIG. 4, the TDMA/TDD frame 200 of the base station 10A and the TDMA/TDD frame 200 of the communication terminal 30A are shown in chronological order. In the TDMA/TDD frame 200 of the base station 10A, an UL-side frame is the upstream frame 200U for transmitting the upstream signal from the communication terminal 30A to the base station 10A, and a DL-side frame is the downstream frame 200D for transmitting the downstream signal from the base station 10A to the communication terminal 30A. In the TDMA/TDD frame 200 of the communication terminal 30A, an UL-side frame is the upstream frame 200U for transmitting the upstream signal from the communication terminal 30A to the base station 10A, and a DL-side frame is the downstream frame 200D for transmitting the downstream signal from the base station 10A to the communication terminal 30A.

Firstly, the base station 10A, after being started, starts to transmit the control information (also referred to as "notification information") of the own station. The transmission of the control information is performed in accordance with a preset intermittent transmission timing by allocating the common channel to one of the time slots included in the downstream frame 200D for transmission from the base station 10A to the communication terminal 30A. For example, in FIG. 4, one downstream time slot (from the viewpoint of the base station 10A, one transmission time slot) BD1 included in a certain TDMA/TDD frame 200A of the base station 10A is allocated as the common channel, and the CCH signal is transmitted.

The communication terminal 30A receives the control information transmitted from the base station 10A, in order to establish the individual communication with the base station 10A. The reception of the control information by the communication terminal 30A is performed in synchronization with the transmission of the CCH signal. For example, in FIG. 4, the reception of the control information transmitted from the base station 10A is performed in a unit time period MD1 that corresponds to the transmission time slot BD1.

The communication terminal 30A receives each control information transmitted from the plurality of base stations and then, based on each control information, identifies the base station to connect. Then, the communication terminal 30A synchronizes a frame timing with the base station (connection base station) to be connected, and transmits a channel request to the connection base station. The transmission of the channel request is performed at the timing to which this connection base station allocates the common channel. For example, in a case where the base station 10A is selected as the connection base station, the transmission of the channel request is performed in an upstream time slot of a frame that is synchronized with the intermittent transmission timing at which the base station 10A transmits the control information. That is, the transmission of the channel request is performed in an upstream time slot (from the viewpoint of the communication terminal 30A, a transmission time slot) MU2 of a frame that is synchronized with a TDMA/TDD frame 200B including time slots BU2, BD2 to which the base station 10A allocates the common channel. The base station 10A allocates the common channel to an upstream time slot (from the viewpoint of the base station 10A, reception time slot) BU2 that is paired with this transmission time slot MU2, and receives the channel request from the communication terminal 30A.

The base station 10A receives the channel request, and then determines a resource to be used as the individual channel in accordance with the channel request. More specifically, the base station 10A allocates, to an empty resource, the individual channel to be used for communication with the communication terminal 30A. Then, the base station 10A transmits information (allocation information) concerning the allocation of the individual channel by using the transmission time slot BD2 to which the common channel is allocated, and notifies the communication terminal 30A of the allocation of the individual channel.

The communication terminal 30A receives the individual channel allocation information in a reception time slot MD2, and then starts communication with the base station 10A by using the allocated individual channel.

In this manner, in the wireless communication system 100, the initial communication through the common channel between the base station 10A and the communication terminal 30A is performed in accordance with the intermittent transmission timing at which the control information is transmitted and in synchronization with the TDMA/TDD frame including the time slot allocated as the common channel.

In the wireless communication system 100, in an area (for example, behind a building or inside a building) where a radio signal from the base station 10A does not reach, the connection between the base station 10A and the communication terminal 30A is achieved via (through) the relay device 50. FIG. 5 is a block diagram showing a configuration of the relay device 50.

As shown in FIG. 5, the relay device 50 includes a first wireless communication unit 51 for performing wireless communication with the base station 10A, a second wireless communication unit 52 for performing wireless communication with the communication terminal 30A, and a relay control unit 53 that controls the first wireless communication unit 51 and the second wireless communication unit 52 to perform a process (relay process) for relaying.

The relay device 50 with such a configuration has a function for amplifying signals received from the base station 10A and the communication terminal 30A and then re-transmitting the signals. In a relay device, it is difficult to perform reception and re-transmission of a radio signal in real time. Therefore, in the relay device 50 of this embodiment, a certain amount of time lag is provided from the reception of a signal to re-transmission of the signal. More specifically, in the relay device 50, a certain amount of time lag exits by the time a signal received by the first wireless communication unit 51 is transmitted from the second wireless communication unit 52 and by the time a signal received by the second wireless communication unit 52 is transmitted from the first wireless communication unit 51.

In this embodiment, a certain time period required from the reception to the re-transmission in the relay device 50 is set to the half the time period of the unit TDMA/TDD frame. That is, the amount of delay in the relay process performed by the relay device 50 is 0.5 frame. Thus, each time a signal exchange via the relay device 50 is performed one time, a delay corresponding to 0.5 frame occurs in the transmission/reception timing of the base station 10A and the communication terminal 30A. In the relay device 50, to ensure a certain amount of delay, a buffer 53a for temporarily storing received signals is provided in the relay control unit 53.

The radio resource allocation unit 131 of this embodiment allocates the common channel not only to the intermittent transmission timing at which the control information is transmitted but also to another timing, in preparation for connection between the base station 10A and the communication terminal 30A via the relay device 50. In other words, the radio resource allocation unit 131 allocates an additional common channel to a time slot included in a TDMA/TDD frame 200 other than the intermittent transmission frame.

Figure 6:
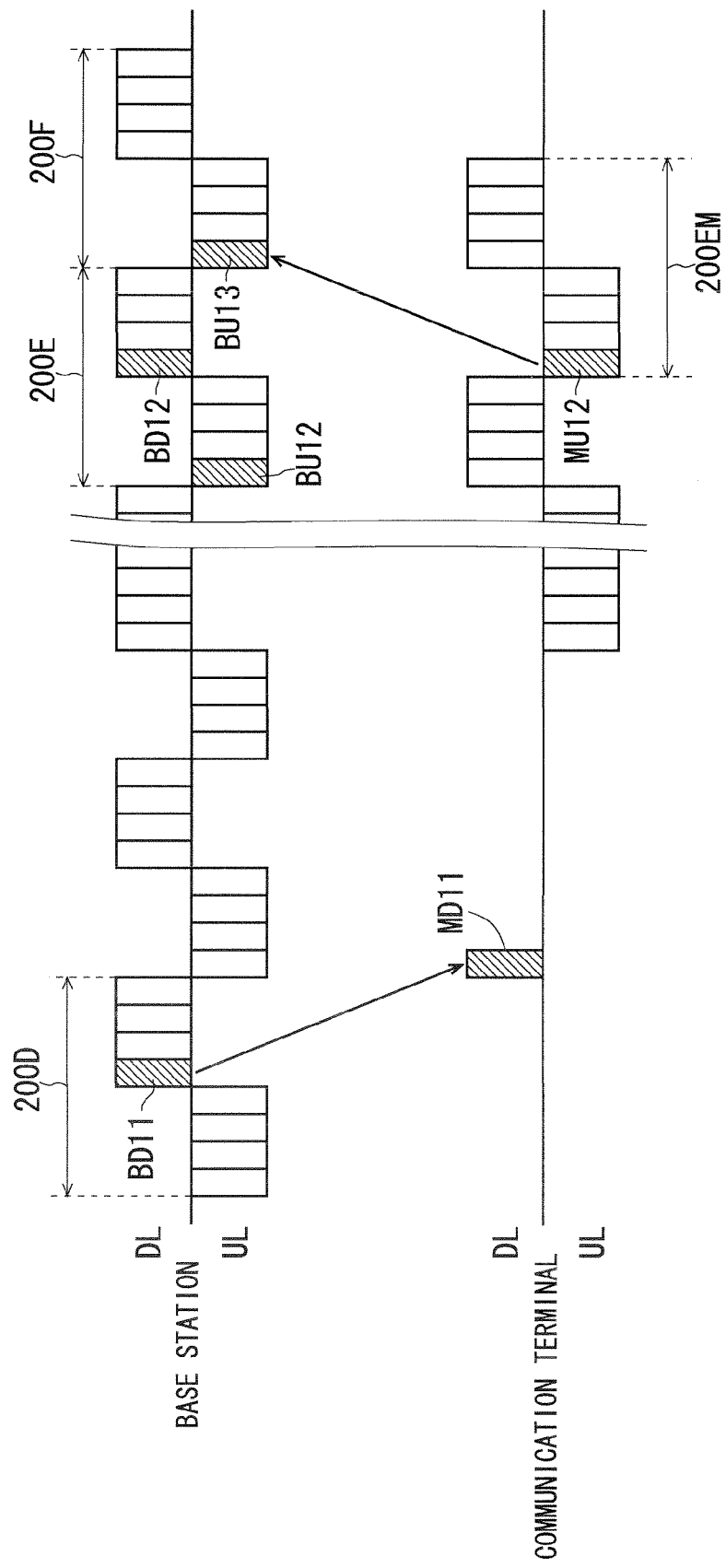
FIG. 6 A diagram for explaining initial communication through the common channel in a case where the relay device is interposed between the base station and a communication terminal.

Here, the initial communication through the common channel between the base station 10A and the communication terminal 30A via the relay device 50 will be described in detail. FIG. 6 is a diagram for explaining the initial communication through the common channel between the base station 10A and the communication terminal 30A via the relay device 50. In FIG. 6, the TDMA/TDD frame 200 of the base station 10A and the TDMA/TDD frame 200 of the communication terminal 30A are shown in chronological order. In the TDMA/TDD frame 200 of the base station 10A, the upstream frame 200U for transmitting the upstream signal from the relay device 50 to the base station 10A is shown in the UL-side, and the downstream frame 200D for transmitting the downstream signal from the base station 10A to the relay device 50 is shown in the DL-side. In the TDMA/TDD frame 200 of the communication terminal 30A, the upstream frame 200U for transmitting the upstream signal from the communication terminal 30A to the relay device 50 is shown in the UL-side, and the downstream frame 200D for transmitting the downstream signal from the relay device 50 to the communication terminal 30A is shown in the DL-side.

The base station 10A, after being started, starts to transmit the control information of the own station. More specifically, as shown in FIG. 6, one transmission time slot BD11 included in a certain TDMA/TDD frame (intermittent transmission frame) 200D of the base station 10A is allocated as the common channel, and the CCH signal is transmitted.

The communication terminal 30A receives the control information transmitted from the base station 10A, in order to establish the individual communication with the base station 10A. The transmission of the CCH signal including the control information is performed via the relay device 50. As described above, the delay corresponding to 0.5 frame occurs in the relay process performed by the relay device 50, and therefore the reception of the control information by the communication terminal 30A is performed at a timing delayed by 0.5 frame from the transmission time slot BD11. That is, in FIG. 6, the reception of the control information by the communication terminal 30A is performed in a unit time period MD11 that is delayed by 0.5 frame from the transmission time slot BD11.

In the communication terminal 30A, as described above, the base station to connect is identified based on the plurality of control information received, and then the channel request is transmitted to the connection base station. A control is made such that the transmission of the channel request is performed at a timing to which this connection base station allocates the common channel. For example, in a case where the base station 10A is selected as the connection base station, the transmission of the channel request is performed in an upstream time slot of a frame that is synchronized with the intermittent transmission frame. More specifically, the communication terminal 30A makes a control such that the transmission of the channel request is performed in a frame that is synchronized with a TDMA/TDD frame 200E including time slots BU12, BD12 to which the base station 10A allocates the common channel.

However, since the signal from the base station 10A to the communication terminal 30A goes through the relay device 50 one time, a shift corresponding to 0.5 frame occurs in the TDMA/TDD frame 200 between the communication terminal 30A and the base station 10A. Accordingly, in the communication terminal 30A, the transmission of the channel request is performed in a transmission time slot MU12 of a TDMA/TDD frame 200EM that is delayed by 0.5 frame from the TDMA/TDD frame 200E. Therefore, in the base station 10A, the reception of the channel request from the communication terminal 30A occurs with a delay corresponding to 0.5 frame.

Moreover, since the transmission of the channel request from the communication terminal 30A to the base station 10A is performed through the relay device 50, the reception of the channel request in the base station 10A occurs with a further delay corresponding to 0.5 frame. Thus, when the base station 10A receives the channel request, a delay corresponding to total one frame occurs.

In the base station 10A of this embodiment, the channel request delayed by one frame is received because of an influence of the relay device 50, and therefore the common channel is allocated also to a time slot of a reception timing in which the channel request via the relay device 50 is supposed to be received.

To be specific, in FIG. 6, the common channel is allocated also to an upstream time slot BU13 included in a TDMA/TDD frame 200F that is next to the TDMA/TDD frame 200E serving as the intermittent transmission frame. The common channel allocated to a time slot included in the TDMA/TDD frame 200 other than the intermittent transmission frame, for receiving the upstream signal from the communication terminal, will be also referred to as "additional common channel".

A timing to which such an additional common channel is allocated (in other words, a reception timing at which the channel request via the relay device 50 is received) is determined based on the amount of delay in the relay process performed by the relay device 50. More specifically, the radio resource allocation unit 131 determines, as the timing to which the additional common channel is allocated, a time point obtained by adding a delay time occurring in the relay device 50 to a time point, in the intermittent transmission frame, to which the common channel is allocated. Here, the delay time occurring in the relay device 50, which is used for the determination of the timing to which the additional common channel is allocated, is a time period resulting from doubling a time period (in this embodiment, a time period corresponding to 0.5 frame) by which the delay occurs in one relay performed by the relay device 50.

Since, in this manner, the common channel is additionally allocated to a predetermined timing in consideration of the delay time occurring in the relay device 50, the base station 10A is allowed to receive the channel request from the communication terminal 30A.

The base station 10A determines a resource to be used as the individual channel in accordance with the received channel request. Then, the base station 10A transmits the individual channel allocation information in a transmission time slot (not shown) included in the next intermittent transmission frame, to notify the communication terminal 30A of the allocation of the individual channel.

The communication terminal 30A receives the individual channel allocation information, and then starts communication with the base station 10A through the allocated individual channel.

As described above, the base station 10A includes the wireless communication unit 11 for performing wireless communication with the communication terminal 30A, and the radio resource allocation unit 131 for allocating a resource of wireless communication as the common channel for upstream communication. The radio resource allocation unit 131 allocates the common channel for upstream communication to both a first reception timing and a second reception timing. The first reception timing is a timing at which the upstream signal from the communication terminal 30A via the relay device 50 is supposed to be received. The second reception timing is a timing at which the upstream signal from the communication terminal 30A without interposition of the relay device 50 is supposed to be received.

The communication system 100 having this base station 10A enables communication to be performed even in a case where the communication is performed with interposition of the relay device 50 between the base station 10A and the communication terminal 30A. In more detail, the initial communication through the common channel can be established between the base station 10A and the communication terminal 30A in a case where relay device 50 is interposed therebetween, and thus the individual communication between the base station 10A and the communication terminal 30A can be established.

When the surrounding base station in the communication system 100 determines allocation of the common channel of the own station, the surrounding base station avoids allocating the common channel to a time slot to which the base station 10A has allocated the common channel, and also avoids allocating the common channel to a reception time slot to which the additional common channel is allocated and a transmission time slot that is paired with the reception time slot. In this manner, the surrounding base station excludes, from candidates for the timing to which the surrounding base station allocates the common channel, a timing to which the base station 10A has allocated the common channel and a timing delayed, by the delay time occurring in the relay device 50, from this timing to which the base station 10A has allocated the common channel. Thus, even if the base station 10A additionally allocates the common channel, no competition in allocation of the common channel occurs between the base stations, and an effective use of the radio resources can be made.

The additional common channel is also allocated to a time slot included in the TDMA/TDD frame 200 next to the intermittent transmission frames 200A, 200B, and 200D, though not shown in FIGS. 4 and 6 for descriptive convenience.

<2. Second Embodiment>

Figure 7:
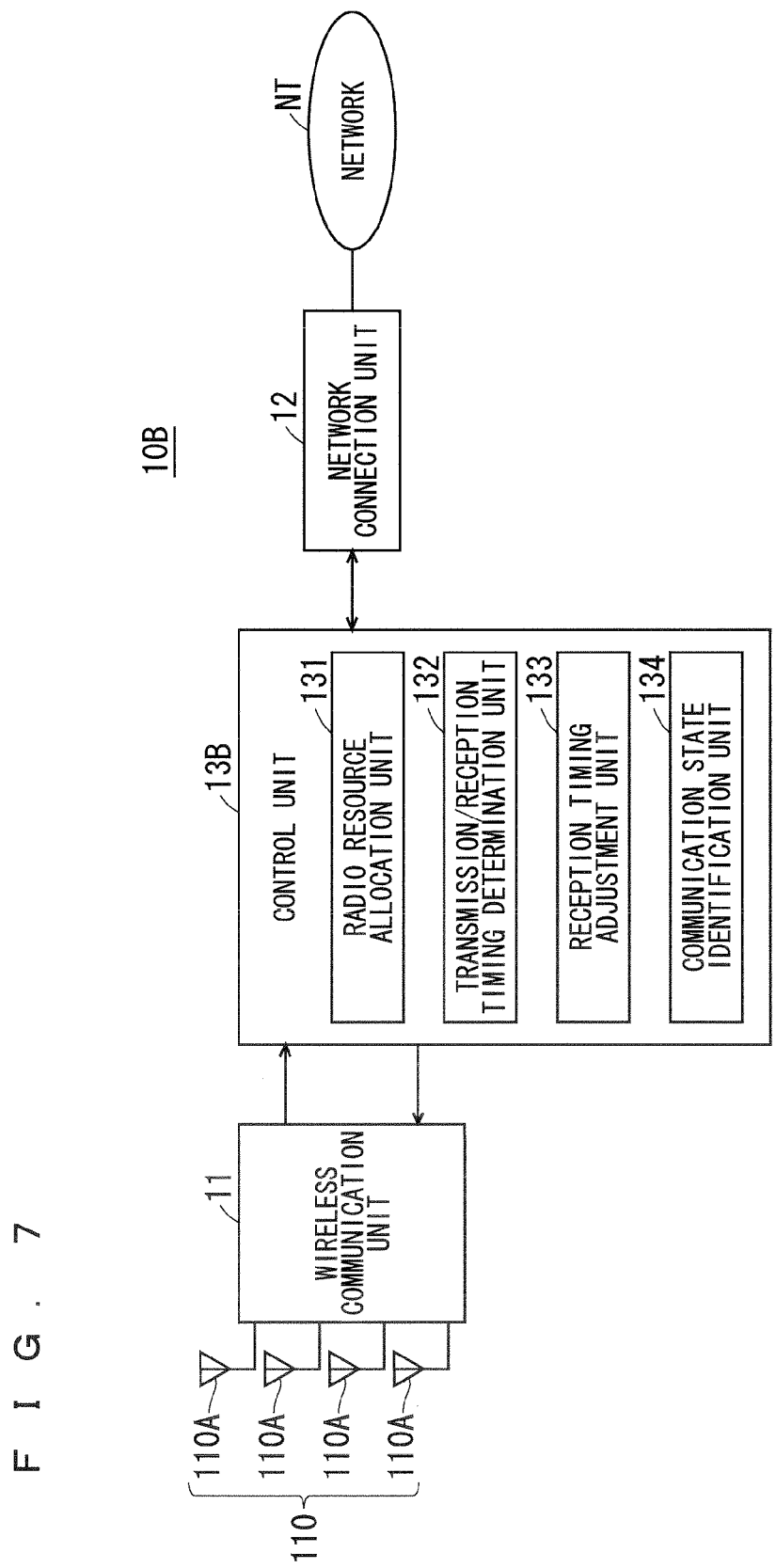
FIG. 7 A block diagram showing a configuration of a base station according to a second embodiment.

Next, a second embodiment will be described. In the first embodiment described above, the initial communication through the common channel in the communication system 100 has been described, but in the second embodiment, the individual communication through the individual channel, which is performed after the initial communication in the communication system 100, will be described. FIG. 7 is a block diagram showing a configuration of a base station 10B according to the second embodiment.

The communication system 100 according to the second embodiment is the same as the communication system 100 according to the first embodiment except that a transmission/reception timing determination unit 132, a reception timing adjustment unit 133, and a communication state identification unit 134 are further functionally implemented by a control unit 13B of the base station 10B. The same parts are denoted by the same reference numeral, and descriptions thereof are omitted.

As shown in FIG. 7, the control unit 13B of the base station 10B functionally implements not only the radio resource allocation unit 131 but also the transmission/reception timing determination unit 132, the communication state identification unit 134, and the reception timing adjustment unit 133.

The transmission/reception timing determination unit 132 determines a transmission/reception timing in the individual communication between the base station 10B and the communication terminal 30A. Details will be described later.

The communication state identification unit 134 identifies whether a communication state of the communication between the base station 10B and the communication terminal 30A is a direct communication state or an indirect communication state. In the direct communication state, the base station 10B and the communication terminal 30A directly communicate with each other. In the indirect communication state, the base station 10B and the communication terminal 30A indirectly communicate with each other through the relay device 50.

The identification of the communication state by the communication state identification unit 134 is determined based on a reception timing at which the channel request is received in the initial communication through the common channel. More specifically, in a case where the channel request from the communication terminal 30A is received through the common channel, the communication state identification unit 134 identifies that a current communication state is the direct communication state, and in a case where the channel request from the communication terminal 30A is received through the additional common channel, the communication state identification unit 134 identifies that the current communication state is the indirect communication state.

The reception timing adjustment unit 133 adjusts a reception timing based on a result of the identification made by the communication state identification unit 134. Details will be described later.

As described above, in the communication system 100, firstly, the initial communication through the common channel is performed between the base station 10B and the communication terminal 30A, so that unique communication is established between the base station 10B and the communication terminal 30A. Then, after the unique communication is established, the individual communication through the individual channel is performed between the base station 10B and the communication terminal 30A.

In the individual communication, firstly, a communication condition is adjusted, and the transmission/reception timing between the base station 10B and the communication terminal 30A through the individual channel is determined. The determination of the transmission/reception timing through the individual channel is made by the transmission/reception timing determination unit 132.

Figure 8:
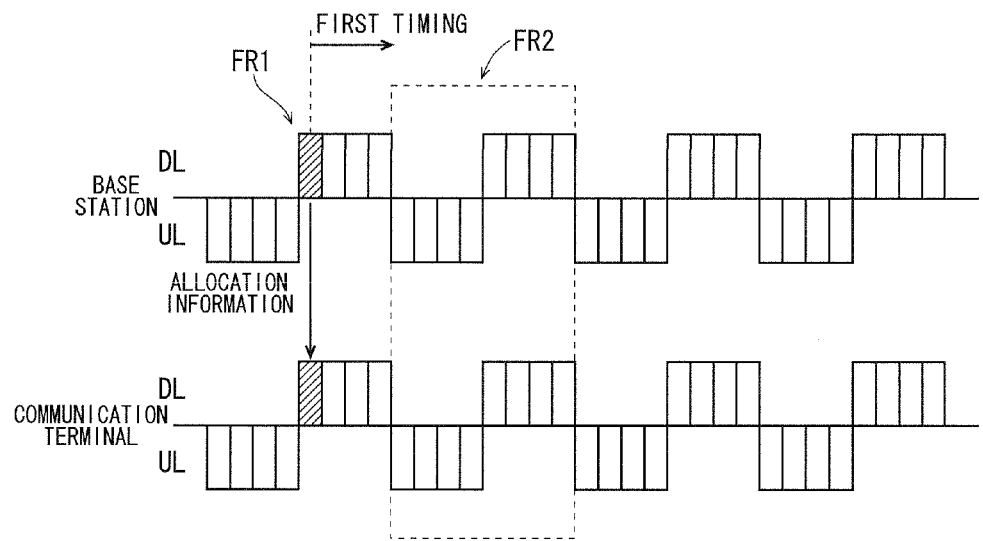
FIG. 8 A diagram for explaining a transmission/reception timing specified between the base station and the communication terminal.
Figure 9:
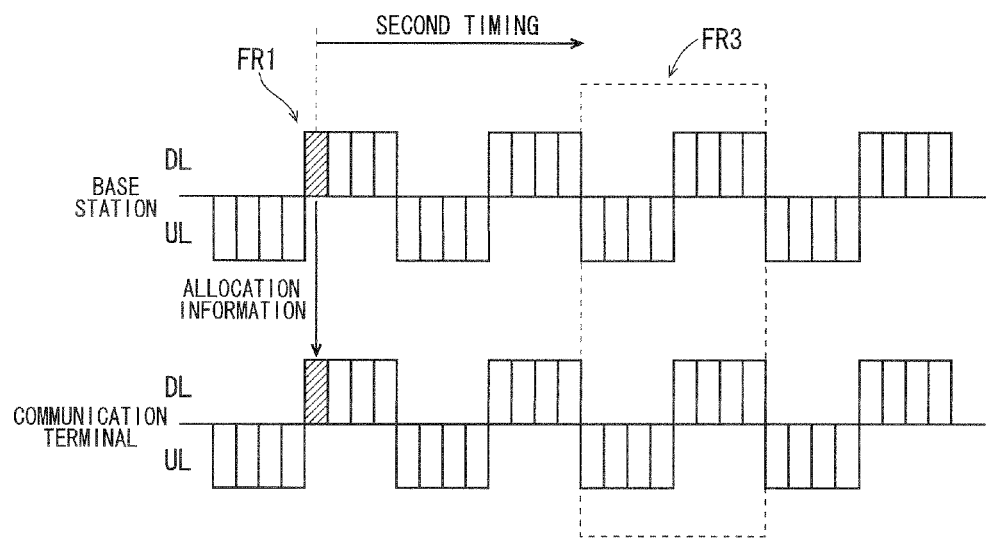
FIG. 9 A diagram for explaining a transmission/reception timing specified between the base station and the communication terminal.

As the transmission/reception timing, two timings, namely, a first timing and a second timing, are specified between the base station 10B and the communication terminal 30A. The first timing and the second timing are referenced to the frame in which the base station 10B has notified the communication terminal 30A of the allocation of the individual channel. FIG. 8 is a diagram for explaining the first timing specified between the base station 10B and the communication terminal 30A, and FIG. 9 is a diagram for explaining the second timing specified between the base station 10B and the communication terminal 30A.

More specifically, in the individual communication, in each one communication using the unit TDMA/TDD frame, the radio resource allocation unit 131 allocates the individual channel. In each one communication, the allocation of the individual channel that is dynamically changed in this manner is notified, as the allocation information, from the base station 10B to the communication terminal 30A. Then, as shown in FIG. 8, at the first timing of the two transmission/reception timings, transmission and reception processes based on allocation information are performed in a frame FR2 (the frame enclosed by the broken line in FIG. 8) that is next to a frame FR1 in which this allocation information has been notified. On the other hand, as shown in FIG. 9, at the second timing of the two transmission/reception timings, transmission and reception processes based on allocation information are performed in a frame FR3 (the frame enclosed by the broken line in FIG. 9) that is second next to the frame FR1 in which this allocation information has been notified.

Thus, in the adjustment of the communication condition that is firstly performed in the individual communication, the determination of the transmission/reception timing, that is, the determination of whether to perform the transmission and reception processes at the first timing or to perform the transmission and reception processes at the second timing, is made. After the determination of the transmission/reception timing, the transmission and reception processes based on the determined transmission/reception timing are performed in the base station 10B and the communication terminal 30A.

Figure 10:
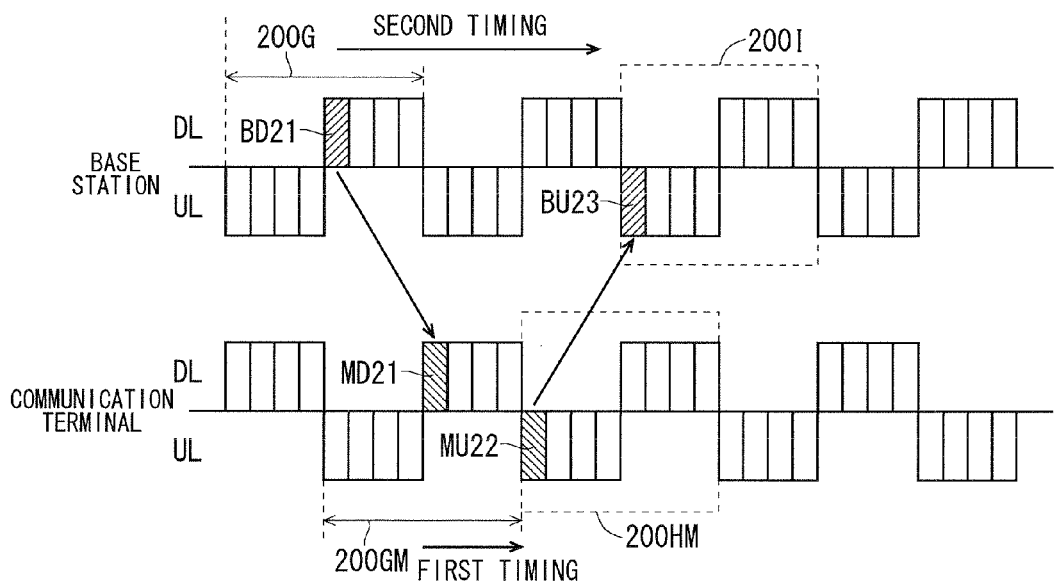
FIG. 10 A diagram for explaining individual communication through an individual channel in a case where the relay device is interposed between the base station and the communication terminal.

Next, a case where the individual communication is performed between the base station 10B and the communication terminal 30A via the relay device 50 will be described in detail. FIG. 10 is a diagram for explaining the individual communication through the individual channel with interposition of the relay device 50. In FIG. 10, the TDMA/TDD frame 200 of the base station 10B and the TDMA/TDD frame 200 of the communication terminal 30A are shown in chronological order. In the TDMA/TDD frame 200 of the base station 10B, the upstream frame 200U for transmitting the upstream signal from the relay device 50 to the base station 10B is shown in the UL-side, and the downstream frame 200D for transmitting the downstream signal from the base station 10B to the relay device 50 is shown in the DL-side. In the TDMA/TDD frame 200 of the communication terminal 30A, the upstream frame 200U for transmitting the upstream signal from the communication terminal 30A to the relay device 50 is shown in the UL-side, and the downstream frame 200D for transmitting the downstream signal from the relay device 50 to the communication terminal 30A is shown in the DL-side. In the individual communication shown in FIG. 10, it is assumed that, in the adjustment of the communication condition mentioned above, the first timing is determined as the transmission/reception timing.

As shown in FIG. 10, one transmission time slot BD21 included in a certain TDMA/TDD frame 200G of the base station 10B is allocated as the individual channel for the individual communication with the communication terminal 30A. At this time, in the transmission time slot BD21, the individual channel allocation information that is dynamically changed is notified to the communication terminal 30A.

Since the transmission of the allocation information is delayed by 0.5 frame in the relay device 50, the communication terminal 30A receives the allocation information from the base station 10B in a reception time slot MD21 that is delayed by 0.5 frame from the transmission time slot BD21.

In this individual communication, the first timing is determined as the transmission/reception timing, and therefore the communication terminal 30A performs a transmission process based on the received allocation information in a transmission time slot MU22 included in a frame 200HM that is next to a frame 200GM in which the allocation information has been received.

Since the allocation information from the base station 10B to the communication terminal 30A goes through the relay device 50 one time, a shift corresponding to 0.5 frame is occurring between the first timing of the base station 10B and the first timing of the communication terminal 30A. Moreover, since information transmitted by the communication terminal 30A at the first timing goes through the relay device 50, this information is delayed by 0.5 frame. Accordingly, in a sequence of communication including the downstream and the upstream, a delay corresponding to total one frame occurs in the timing at which the base station 10B receives the information transmitted at the first timing of the communication terminal 30A.

In the base station 10B of this embodiment, the reception timing is changed, in order to receive the information from the communication terminal 30A delayed by one frame due to the influence of the relay device 50. That is, the base station 10B does not perform the reception process at the first timing determined in advance, but performs the reception process at the second timing that is later than the first timing. In more detail, in FIG. 10, the individual channel (individual channel for upstream communication) based on allocation information is set to a reception time slot BU23 included in a TDMA/TDD frame 2001 that is second next to the TDMA/TDD frame 200G in which this allocation information has been notified, and the reception process is performed.

Such a change (adjustment) of the reception timing is made by the reception timing adjustment unit 133 (see FIG. 7) based on the communication state identified by the communication state identification unit 134. To be specific, in a case where the communication state of the communication between the base station 10B and the communication terminal 30A is the indirect communication state, the reception timing adjustment unit 133 adjusts the reception timing such that a timing later than the transmission/reception timing determined by the transmission/reception timing determination unit 132 is set as a timing of the reception process. That is, the reception timing adjustment unit 133 uses the individual channel for upstream communication at a timing later than the transmission/reception timing, to implement the reception process for receiving the upstream signal via the relay device 50.

On the other hand, in a case where the communication state of the communication between the base station 10B and the communication terminal 30A is the direct communication state, the reception timing adjustment unit 133 does not adjust the reception timing. That is, in a case of the direct communication state, the reception process is performed at the transmission/reception timing set by the transmission/reception timing determination unit 132.

Although FIG. 10 illustrates a case where the first timing is determined as the transmission/reception timing, the reception timing adjustment unit 133 performs the same adjustment also in a case where the second timing is determined as the transmission/reception timing. That is, the reception timing adjustment unit 133 adjusts the reception timing such that the reception process is performed in the TDMA/TDD frame 200 that is later by one frame than the frame identified at the second timing.

In the next-generation PHS, a transmission/reception timing later than the second timing is not specified. However, the adjustment of the reception timing by the reception timing adjustment unit 133 is an internal process of the base station 10B, and therefore it can be implemented without influencing the other parts.

In the indirect communication state, a timing (also referred to as "usage timing") at which the individual channel for upstream communication is used is determined by the reception timing adjustment unit 133 based on the amount of delay in the relay process performed by the relay device 50. More specifically, the usage timing is a timing obtained by adding, to the transmission/reception timing, a time period resulting from doubling a time period corresponding to the amount of delay (herein, 0.5 frame) in the relay device 50.

As described above, the base station 10B includes: the wireless communication unit 11 for performing wireless communication with the communication terminal 30A; the radio resource allocation unit 131 for allocating the resource of wireless communication as the individual channel; the transmission/reception timing determination unit 132 for determining the transmission/reception timing at which the transmission and reception are performed with the communication terminal 30A through the individual channel; the communication state identification unit 134 for identifying whether the communication with the communication terminal 30A is the indirect communication with interposition of the relay device 50 or the direct communication without interposition of the relay device 50; and the reception timing adjustment unit 133 for adjusting the timing at which the individual channel for upstream communication is used in accordance with a result of the identification made by the communication state identification unit 134. The wireless communication unit 11 notifies the communication terminal 30A of the transmission/reception timing and the individual channel allocated by the radio resource allocation unit 131. The reception timing adjustment unit 133 uses the individual channel for upstream communication at the transmission/reception timing in a case where the communication with the communication terminal 30A is the direct communication, and uses the individual channel for upstream communication at a timing later than the transmission/reception timing in a case where the communication with the communication terminal 30A is the indirect communication.

The communication system 100 having this base station 10B enables communication even in a case where the communication is performed with interposition of the relay device 50 between the base station 10B and the communication terminal 30A. In more detail, the individual communication through the individual channel can be established between the base station 10B and the communication terminal 30A in a case where the relay device 50 is interposed therebetween.

<3. Third Embodiment>

Figure 11:
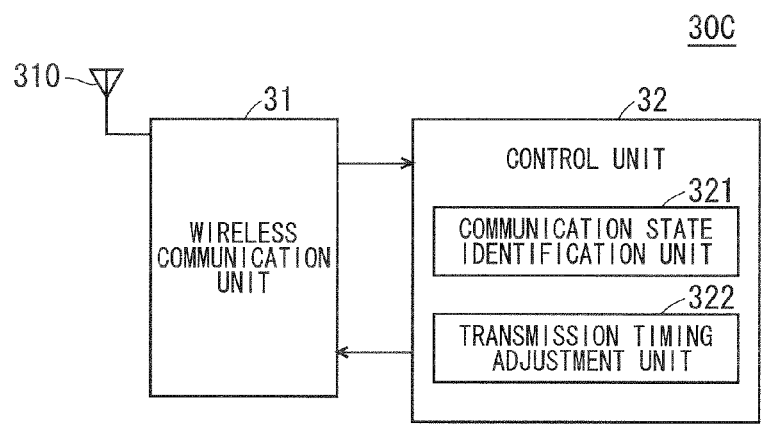
FIG. 11 A block diagram showing a configuration of a communication terminal according to a third embodiment.

Next, a third embodiment will be described. In the second embodiment described above, in the individual communication through the individual channel, the shift of the reception timing caused by interposition of the relay device 50 is corrected by the base station 10B. In the third embodiment, on the other hand, the shift of the reception timing is corrected by a communication terminal 30C. FIG. 11 is a block diagram showing a configuration of the communication terminal 30C according to third embodiment.

The communication system 100 according to the third embodiment is the same as the communication system 100 according to the first embodiment except that the communication terminal 30C has a function for correcting the shift of the reception timing. Thus, the parts in common with each other are denoted by the same reference numeral, and descriptions thereof are omitted.

As shown in FIG. 11, the communication terminal 30C performs bi-directional wireless communication with the base station 10A by a communication scheme using the OFDMA. The communication terminal 30C includes a wireless communication unit 31 for performing wireless communication, and a control unit 32 for performing an overall control of the communication terminal 30C.

The wireless communication unit 31 obtains data from an OFDM signal received by an antenna element 310, and outputs the data to the control unit 32. The wireless communication unit 31 generates an OFDM signal including transmission data received from the control unit 32, and wirelessly transmits the OFDM signal via the antenna element 310.

The control unit 32 includes a CPU, a storage unit, and the like, and reads out a program stored in the storage unit and executes the program in the CPU to thereby functionally implement a communication state identification unit 321 and a transmission timing adjustment unit 322.

The communication state identification unit 321 identifies whether a communication state of communication between the base station 10A and the communication terminal 30C is the direct communication state or the indirect communication state.

The transmission timing adjustment unit 322 adjusts the transmission timing based on a result of the identification made by the communication state identification unit 321. Details will be described later.

Figure 12:
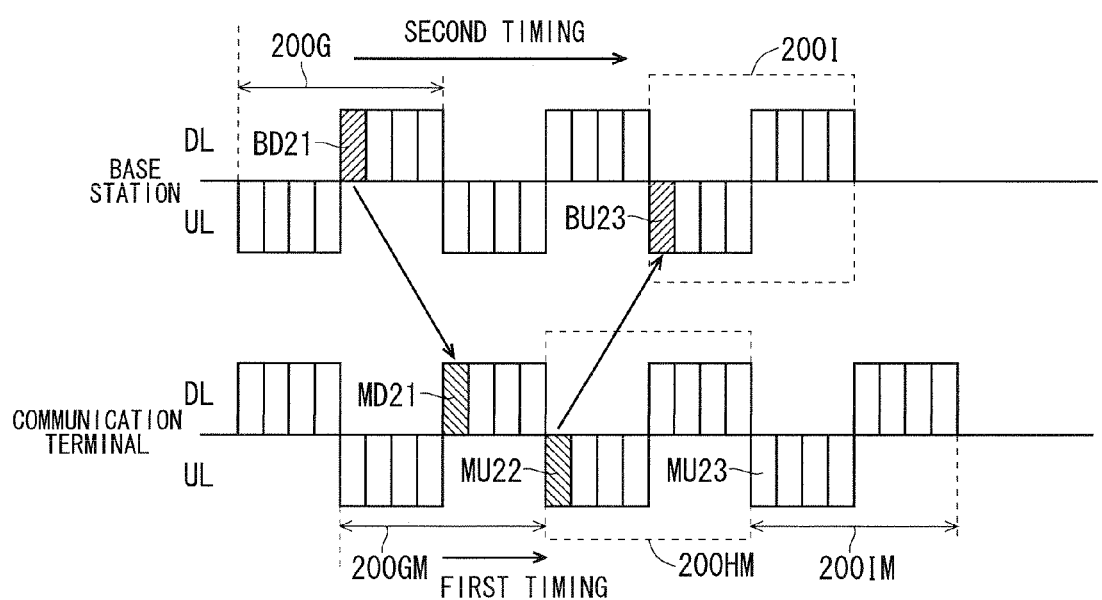
FIG. 12 A diagram for explaining individual communication through the individual channel in a case where the relay device is interposed between the base station and the communication terminal.

Next, a case where the individual communication is performed between the base station 10A and the communication terminal 30C via the relay device 50 will be described in detail. FIG. 12 is a diagram for explaining the individual communication through the individual channel with interposition of the relay device 50. In FIG. 12, the TDMA/TDD frame 200 of the base station 10A and the TDMA/TDD frame 200 of the communication terminal 30C are shown in chronological order. In the TDMA/TDD frame 200 of the base station 10A, the upstream frame 200U for transmitting the upstream signal from the relay device 50 to the base station 10A is shown in the UL-side, and the downstream frame 200D for transmitting the downstream signal from the base station 10A to the relay device 50 is shown in the DL-side. In the TDMA/TDD frame 200 of the communication terminal 30C, the upstream frame 200U for transmitting the upstream signal from the communication terminal 30C to the relay device 50 is shown in the UL-side, and the downstream frame 200D for transmitting the downstream signal from the relay device 50 to the communication terminal 30C is shown in the DL-side. In the individual communication shown in FIG. 12, it is assumed that, in the adjustment of the communication condition mentioned above, the second timing is determined as the transmission/reception timing. In this embodiment, it is assumed that a specific frequency band serves as a frequency band dedicated for a relay device, and the relay device 50 of this embodiment changes the frequency band of a signal received from the base station 10A and the communication terminal 30C into this specific frequency band, and then outputs the signal.

As shown in FIG. 12, one transmission time slot BD21 included in a certain TDMA/TDD frame 200G of the base station 10A is allocated as the individual channel for the individual communication with the communication terminal 30C. At this time, in the transmission time slot BD21, the individual channel allocation information that is dynamically changed is notified to the communication terminal 30C.

Since the transmission of the allocation information is delayed by 0.5 frame in the relay device 50, the communication terminal 30C receives the allocation information from the base station 10B in a reception time slot MD21 that is delayed by 0.5 frame from the transmission time slot BD21.

Here, in this individual communication, the second timing is determined as the transmission/reception timing. Therefore, in a case where the transmission timing of the communication terminal 30C is not adjusted, the communication terminal 30C performs the transmission process based on the received allocation information in a transmission time slot MU23 included in a frame 200IM that is second next to the frame 200GM in which this allocation information has been received.

Since the allocation information from the base station 10A to the communication terminal 30C goes through the relay device 50 one time, a shift corresponding to 0.5 frame is occurring between the second timing of the base station 10A and the second timing of the communication terminal 30C. Moreover, since information transmitted by the communication terminal 30C at the second timing goes through the relay device 50, this information is delayed by 0.5 frame. Accordingly, in a sequence of communication including the downstream and the upstream, a delay corresponding to total one frame occurs in the timing at which the base station 10A receives the information transmitted at the second timing of the communication terminal 30C.

The communication terminal 30C of this embodiment changes the transmission timing, to correct the shift corresponding to one frame caused due to the influence of the relay device 50. That is, the communication terminal 30C does not perform the transmission process at the second timing determined in advance, but performs the transmission process at the first timing earlier than the second timing. In more detail, in FIG. 12, the individual channel (individual channel for upstream communication) based on allocation information is set to a transmission time slot MU22 included in a TDMA/TDD frame 200HM that is next to the TDMA/TDD frame 200GM in which this allocation information has been received, and the transmission process is performed.

Such a change (adjustment) of the transmission timing is made by the transmission timing adjustment unit 322 (see FIG. 11) based on the communication state identified by the communication state identification unit 321. To be specific, in a case where the communication state of the communication between the base station 10A and the communication terminal 30C is the indirect communication state, the transmission timing adjustment unit 322 adjusts the transmission timing such that a timing earlier than the transmission/reception timing notified by the base station 10A is set as a timing of the transmission process. That is, the transmission timing adjustment unit 322 uses the individual channel for upstream communication at a timing earlier than the transmission/reception timing, to perform the transmission process for transmitting the upstream signal.

On the other hand, in a case where the communication state of the communication between the base station 10A and the communication terminal 30C is the direct communication state, the transmission timing adjustment unit 322 does not adjust the transmission timing. That is, in a case of the direct communication state, the transmission process is performed at the transmission/reception timing notified by the base station 10A.

The identification of the communication state by the communication state identification unit 321 is made based on the frequency band of a signal received by the communication terminal 30C. More specifically, in a case where the frequency band of the received signal is the frequency band dedicated for the relay device, the communication state identification unit 321 identifies that the current communication state is the indirect communication state. On the other hand, in a case where the frequency band of the received signal is a frequency band different from the frequency band dedicated for the relay device, the communication state identification unit 321 identifies that the current communication state is the direct communication state.

As a method for identifying the communication state, the following methods may be mentioned.

To be specific, since the relay device 50 changes the frequency band of a signal received from the base station 10A into the frequency band dedicated for the relay device and then outputs the signal, if a signal transmitted from the base station 10A includes information (frequency information) of a frequency band used for the transmission, the current communication state can be identified by comparing a result of analysis of this information with the actual frequency band of the received signal.

In another possible method, the relay device 50 adds, to a signal going through the relay device 50, information indicating that this signal has gone through the relay device 50, and the communication terminal 30 checks the added information (additional information) to thereby identify the current communication state.

As described above, the communication terminal 30C includes: the wireless communication unit 31 for performing wireless communication with the base station 10A; the communication state identification unit 321 for identifying whether the communication with the base station 10A is the indirect communication with interposition of the relay device 50 or the direct communication without interposition of the relay device 50; and the transmission timing adjustment unit 322 for adjusting the timing at which the individual channel for upstream communication is used in accordance with the result of the identification made by the communication state identification unit 321. The wireless communication unit 31 receives, from the base station 10A, information concerning the transmission/reception timing at which the transmission and reception are performed with the base station 10A and information concerning the allocation of the individual channel. The transmission timing adjustment unit 322 uses the individual channel for upstream communication at the transmission/reception timing in a case where the communication with the base station 10A is the direct communication, and uses the individual channel for upstream communication at a timing earlier than the transmission/reception timing in a case where the communication with the base station 10A is the indirect communication.

The communication system 100 having this communication terminal 30C enables communication even in a case where the communication is performed with interposition of the relay device 50 between the base station 10A and the communication terminal 30C. In more detail, the individual communication through the individual channel can be established between the base station 10A and the communication terminal 30C in a case where the relay device 50 is interposed therebetween.

In the communication terminal 30C, although the transmission timing is changed, the reception timing is not changed. Thus, the communication terminal 30C performs the reception process at the transmission/reception timing notified by the base station 10A.

<4. Modifications>

Although some embodiments have been described, the present invention is not limited to the above-described ones.

For example, in the embodiments described above, the relay device 50 relays a signal from a relay source to a relay destination with a delay of 0.5 frame. However, this is not limitative, and the amount of delay in the relay device 50 may be varied.

The amount of delay in the relay device 50 may be set to be N frames (N is an integer equal to or greater than one) or (M+0.5) frames (M is an integer equal to or greater than zero), as long as the base station 10A allocates the upstream common channel and the downstream common channel to slots located in the same position in the upstream frame 200U and in the downstream frame 200D of the TDMA/TDD frame 200. In other words, the amount of delay in the relay device 50 may be set such that double the amount thereof is equal to an integer multiple of the frame length. The amount of delay herein means the amount of delay caused by one relay.

In the first and second embodiments described above, the relay device 50 transmits a signal from the relay source to the relay destination without performing frequency conversion thereon. However, this is not limitative, and it may be acceptable that the relay device 50 transmits a signal from the relay source to the relay destination with performing frequency conversion thereon.

To be specific, in a case where the relay device 50 transmits a signal from the relay source to the relay destination with performing frequency conversion thereon, a frequency band used by the first wireless communication unit 51 at the base station side for communication with the base station 10A (10B) is different from a frequency band used by the second wireless communication unit 52 at the communication terminal side for communication with the communication terminal 30A. That is, the frequency band of the first sub channel SCH1 to a ninth sub channel SCH9 used for the communication between the base station 10A (10B) and the relay device 50 are different from the frequency band of the first sub channel SCH1 to a ninth sub channel SCH9 used for the communication between the relay device 50 and the communication terminal 30A.

In this manner, by using different frequency bands between communication at the base station side and communication at the communication terminal side, occurrence of cross talk between the communications can be avoided. For example, even if a transmission signal of the communication terminal 30A that is communicating with the base station 10A (10B) via the relay device 50 directly reaches the base station 10A (10B), this transmission signal is prevented from becoming an interference wave in the base station 10A (10B).

In the relay device 50 configured to change a frequency band used for communication, there is a possibility that a delay due to a frequency conversion process occurs from reception to re-transmission. In the XGP, the communication is performed while transmission and reception timing is fixedly synchronized between the base station 10A (10B) and the communication terminal 30A. Therefore, in a case of performing communication by using the relay device 50 that causes a delay due to the frequency conversion process, there is a possibility that communication cannot be performed between the base station 10A (10B) and the communication terminal 30A. In this case as well, the base station 10A, 10B of the first and second embodiments enables communication between the base station 10A, 10B and the communication terminal 30A.

The relay device 50 is not limited to the one configured to change the frequency band between communication at the base station side and communication at the communication terminal side.

In the first embodiment described above, it is preferable that the interval of intermittent transmission of the control information is set to be an integer multiple of the value obtained by doubling the amount of delay caused by one relay in the relay device 50. Setting the interval of the intermittent transmission in accordance with such a rule enables the best improvement in the efficiency of allocation of common channels by a plurality of base stations. The interval of the intermittent transmission can also be expressed as the interval of allocation of the common channel for downstream communication to the TDMA/TDD frame 200, and the interval of allocation of the common channel for upstream communication to the TDMA/TDD frame 200.

In the first embodiment described above, it may be also possible that, in a case where absolute frames can be specified in the communication system 100, the frames are distinguished into odd-number frames and even-number frames, and the odd-number frames are used as frames for the intermittent transmission of the control information by the respective base stations while the even-number frames are used as frames for the reception process for receiving signals having gone through the relay device 50. This can improve the efficiency of allocation of common channels.

In the communication system 100, if it is assumed that a frame including a time slot to which the common channel is firstly allocated in the radio resources is recognized as the odd-number frame, each base station can identify other odd-number frames on the basis of this odd-number frame. That is, each base station may allocate the common channel for downstream communication to every another TDMA/TDD frame on the basis of the TDMA/TDD frame including the transmission timing to which the common channel for downstream communication is firstly allocated in the radio resources.

Although the communication state identification unit 134 of the first embodiment described above identifies the communication state based on the reception timing at which the channel request is received, this is not limiting.

For example, in a case where the communication terminal 30A has a function for identifying the current communication state similarly to the communication terminal 30C of the third embodiment, it may be possible that the communication terminal 30A informs the base station 10A of the current communication state and thereby the base station 10A recognizes the current communication state.

As a method in which the communication terminal 30A informs the base station 10A of the communication state, there are a plurality of methods. For example, among six TCCH (Timing Correct Channel) symbol patterns used for the channel request transmission signal, different TCCH symbol patterns are used between the direct communication and the indirect communication, and thereby inform the base station 10A of the communication state. Alternatively, since the time slot is composed of a plurality of sub-slots, the channel request transmission timing may be varied on a sub-slot basis between the direct communication and the indirect communication, to thereby inform the base station 10A of the communication state. Instead, after the individual communication is established, in adjusting the communication condition, the communication terminal 30A may notify the base station 10A of the communication state.

In the embodiment and the modifications described above, a case where the present invention is applied to the next-generation PHS has been described. However, the present invention is applicable to other communication systems. For example, the present invention is also applicable to the LTE (Long Term Evolution) or the WiMAX (Worldwide Interoperability for Microwave Access).

While the invention has been described in detail, the foregoing description is in all aspects illustrative and not restrictive. It will be appreciated that numerous modifications unillustrated herein can be made without departing from the scope of the present invention.

DESCRIPTION OF THE REFERENCE NUMERALS

100 Wireless Communication System
10A, 10B Base Station
11, 31 Wireless Communication Unit
30A, 30C, 301 Communication Terminal
50 Relay Device
131 Radio Resource Allocation Unit
132 Transmission/Reception Timing Determination Unit
133 Reception Timing Adjustment Unit
134 Communication State Identification Unit
200 TDMA/TDD Frame The invention claimed:

1. A base station comprising:
a communication unit for performing wireless communication with a communication terminal;
a channel allocation unit for allocating an individual channel in a resource of the wireless communication;
a determination unit for determining a transmission/reception timing at which transmission and reception with the communication terminal through the individual channel is performed;
an identification unit for identifying whether communication with the communication terminal is indirect communication with interposition of a relay device or direct communication without interposition of the relay device; and
an adjustment unit for adjusting a timing at which an individual channel for upstream communication is used in accordance with a result of the identification made by the identification unit,
wherein
the communication unit notifies the communication terminal of the transmission/reception timing and an individual channel allocated by the channel allocation unit,
the adjustment unit uses the individual channel for upstream communication at the transmission/reception timing in a case where communication with the communication terminal is direct communication, and uses the individual channel for upstream communication at a timing later than the transmission/reception timing in a case where communication with the communication terminal is indirect communication.

2. The base station according to claim 1, wherein
the adjustment unit determines a usage timing at which an individual channel is used in a case of the indirect communication, based on the amount of delay in a relay process performed by the relay device.

3. A communication terminal comprising:
a communication unit for performing wireless communication with a base station;
an identification unit for identifying whether communication with the base station is indirect communication with interposition of a relay device or direct communication without interposition of the relay device; and
an adjustment unit for adjusting a timing at which an individual channel for upstream communication is used in accordance with a result of the identification made by the identification unit,
wherein
the communication unit receives, from the base station, information concerning a transmission/reception timing at which transmission and reception with a base station is performed and information concerning allocation of an individual channel,
the adjustment unit uses the individual channel for upstream communication at the transmission/reception timing in a case where communication with the base station is direct communication, and uses the individual channel for upstream communication at a timing earlier than the transmission/reception timing in a case where communication with the base station is indirect communication.

4. A communication system comprising:
a base station configured to communicate with a communication terminal; and
a relay device configured to relay a signal from the communication terminal to the base station and to relay a signal from the base station to the communication terminal,
wherein
the base station includes:
a communication unit for performing wireless communication with the communication terminal;
a channel allocation unit for allocating an individual channel in a resource of the wireless communication;
a determination unit for determining a transmission/reception timing at which transmission and reception with the communication terminal through the individual channel is performed;
an identification unit for identifying whether communication with the communication terminal is indirect communication with interposition of a relay device or direct communication without interposition of the relay device; and
an adjustment unit for adjusting a timing at which an individual channel for upstream communication is used in accordance with a result of the identification made by the identification unit,
the communication unit notifying the communication terminal of the transmission/reception timing and an individual channel allocated by the channel allocation unit,
the adjustment unit using the individual channel for upstream communication at the transmission/reception timing in a case where communication with the communication terminal is direct communication, and using the individual channel for upstream communication at a timing later than the transmission/reception timing in a case where communication with the communication terminal is indirect communication.

5. A communication system comprising:

a communication terminal;

a base station configured to communicate with the communication terminal; and a relay device configured to relay a signal from the communication terminal to the base station and to relay a signal from the base station to the communication terminal, wherein the base station includes:

- a communication unit for performing wireless communication with the communication terminal;
- a channel allocation unit for allocating an individual channel in a resource of the wireless communication; and
- a determination unit for determining a transmission/reception timing at which transmission and reception with the communication terminal through the individual channel is performed, the communication unit of the base station notifying the communication terminal of the transmission/reception timing and an individual channel allocated by the channel allocation unit, the communication terminal includes:

- a communication unit for performing wireless communication with the base station;
- an identification unit for identifying whether communication with the base station is indirect communication with interposition of a relay device or direct communication without interposition of the relay device; and
- an adjustment unit for adjusting a timing at which an individual channel for upstream communication is used in accordance with a result of the identification made by the identification unit, the adjustment unit using the individual channel for upstream communication at the transmission/reception timing in a case where communication with the base station is direct communication, and using the individual channel for upstream communication at a timing earlier than the transmission/reception timing in a case where communication with the base station is indirect communication.

* * * * *